(12) United States Patent
Nicgorski, II

(10) Patent No.: US 8,151,656 B2
(45) Date of Patent: Apr. 10, 2012

(54) TEST FIXTURE FOR AUTOMOTIVE WIPER SYSTEMS

(75) Inventor: Dana F Nicgorski, II, Salem, MA (US)

(73) Assignee: Robert Bosch GmbH, Stuttgart (DE)

( * ) Notice: Subject to any disclaimer, the term of this patent is extended or adjusted under 35 U.S.C. 154(b) by 141 days.

(21) Appl. No.: 12/797,292

(22) Filed: Jun. 9, 2010

(65) Prior Publication Data

US 2011/0303021 A1    Dec. 15, 2011

(51) Int. Cl.
*G01D 7/00* (2006.01)
*G01L 1/04* (2006.01)

(52) U.S. Cl. .................. 73/865.3; 73/865.8; 73/862.041; 73/862.043; 73/862.632

(58) Field of Classification Search ............. 73/862.041, 73/862.042, 862.043, 862.621, 862.625, 73/862.632, 862.637, 865.3, 7, 9, 865.8, 73/662, 663, 670, 671, 841, 855, 856, 858, 73/860, 866

See application file for complete search history.

(56) References Cited

U.S. PATENT DOCUMENTS

| | | | |
|---|---|---|---|
| 3,919,884 | A | 11/1975 | Gunderson et al. |
| 4,658,656 | A | 4/1987 | Haeg |
| 4,733,558 | A | 3/1988 | Grenier |
| 4,802,365 | A | 2/1989 | Sallberg et al. |
| 5,050,442 | A | 9/1991 | Reed |
| 5,083,453 | A | 1/1992 | Daley |
| 5,696,319 | A | 12/1997 | Chung et al. |
| 6,035,715 | A | 3/2000 | Porter |
| 6,148,470 | A | 11/2000 | Buchanan, Jr. et al. |
| 6,640,638 | B1 | 11/2003 | Haeg et al. |
| 6,718,833 | B2 | 4/2004 | Xie et al. |
| 6,895,830 | B2 | 5/2005 | Kochersberger et al. |
| 7,080,565 | B2 | 7/2006 | Delair et al. |
| 7,237,445 | B1 | 7/2007 | Perin |

*Primary Examiner* — Lisa Caputo
*Assistant Examiner* — Jonathan Dunlap
(74) *Attorney, Agent, or Firm* — Faegre Baker Daniels LLP

(57) ABSTRACT

A test fixture is provided for automotive wiper systems. The wiper system includes a plurality of connection points and one or more wiper arm connectors. The test fixture measures forces caused by the wiper system's operation at the plurality of connection points while a resistive torque is applied to each of the wiper arm connectors. The test fixture allows for multiple attachment configurations to accommodate the many wiper system configurations that exist.

30 Claims, 8 Drawing Sheets

TEST FIXTURE FOR AUTOMOTIVE WIPER SYSTEMS

BACKGROUND AND SUMMARY

The present disclosure relates to a fixture for testing operation of an electrically driven automotive component. More particularly, the present invention relates to a test fixture for testing operation of automotive wiper systems.

Many different configurations of wiper systems exist for vehicles. It is desirable to test operational performance of these wiper systems under controlled conditions. In particular, measuring forces at the vehicle to wiper linkage connection locations under realistic operating loads can be correlated to in-vehicle noise performance of the wiper systems.

The test fixture of the present disclosure measures the vehicle to wiper system connection location forces under an approximation of an infinite-mass boundary condition; this measurement method is known as a "blocked force measurement". The test fixture of the present disclosure illustratively measures forces at the connection points between the wiper system and the vehicle in three translational directions while approximating an infinite-mass boundary condition. The test fixture illustratively applies a user-adjustable smooth resistive torque to the wiper arm connection points of the wiper system to provide an appropriate operating load. The test fixture of the present disclosure has flexible mounting configurations to accommodate the many different wiper system configurations that exist.

Resonant frequencies of test fixture support structures can introduce errors in test fixture measurements. The test fixture of the present disclosure is designed to avoid the effects of these test fixture resonances in the frequency range of interest for the test procedures.

Within an illustrated embodiment of the present disclosure, a test fixture is provided for a wiper system including a linkage and a motor coupled to the linkage. The linkage includes a plurality of connection points and first and second wiper arm connectors. Wiper systems without a linkage or with a differing number of connection points and/or wiper arm connectors can also be tested by the fixture of the present disclosure. The test fixture includes first and second spaced apart support walls, each support wall having an inner surface and a top surface, a base located between the inner surfaces of the first and second support walls, and first and second tracks coupled to the top surfaces of the first and second support walls, respectively. The test fixture also includes first and second cross beams moveably coupled to the first and second tracks, and first and second brake assemblies coupled to the first and second cross beams, respectively. The first and second brake assemblies each include a brake support structure coupled to a respective one of the first and second cross beams so that each brake support structure is moveable along a longitudinal axis of the cross beam and is also rotatable relative to the cross beam. The first and second brake assemblies also include a brake coupled to the brake support structure and a connector coupled to a brake shaft of the brake. The connector is configured to be coupled to one of the wiper arm connectors of the linkage so that the brake applies a resistive torque to the wiper arm connector. The test fixture further includes a torque sensor mounted to each brake shaft of the first and second brake assemblies, the torque sensor measuring the resistive force applied by the brake to the wiper arm connector. The test fixture still further includes a plurality of mounting blocks configured to be coupled to the base at a plurality of selected locations. Each mounting block includes a coupler configured to be coupled to one of the connection points of the linkage of the wiper system. The test fixture also includes a plurality of force sensors. A force sensor is coupled between each coupler and the connection point of the wiper system. The force sensors measure forces at the connection points of the wiper system during movement of the wiper system by the motor.

Additional features and advantages of the present system will become apparent to those skilled in the art upon consideration of the following detailed description of illustrative embodiments exemplifying the best mode of carrying out the present system as presently perceived.

BRIEF DESCRIPTION OF THE DRAWINGS

The detailed description particularly refers to the accompanying figures in which.

DETAILED DESCRIPTION OF THE DRAWINGS

Figure 1:
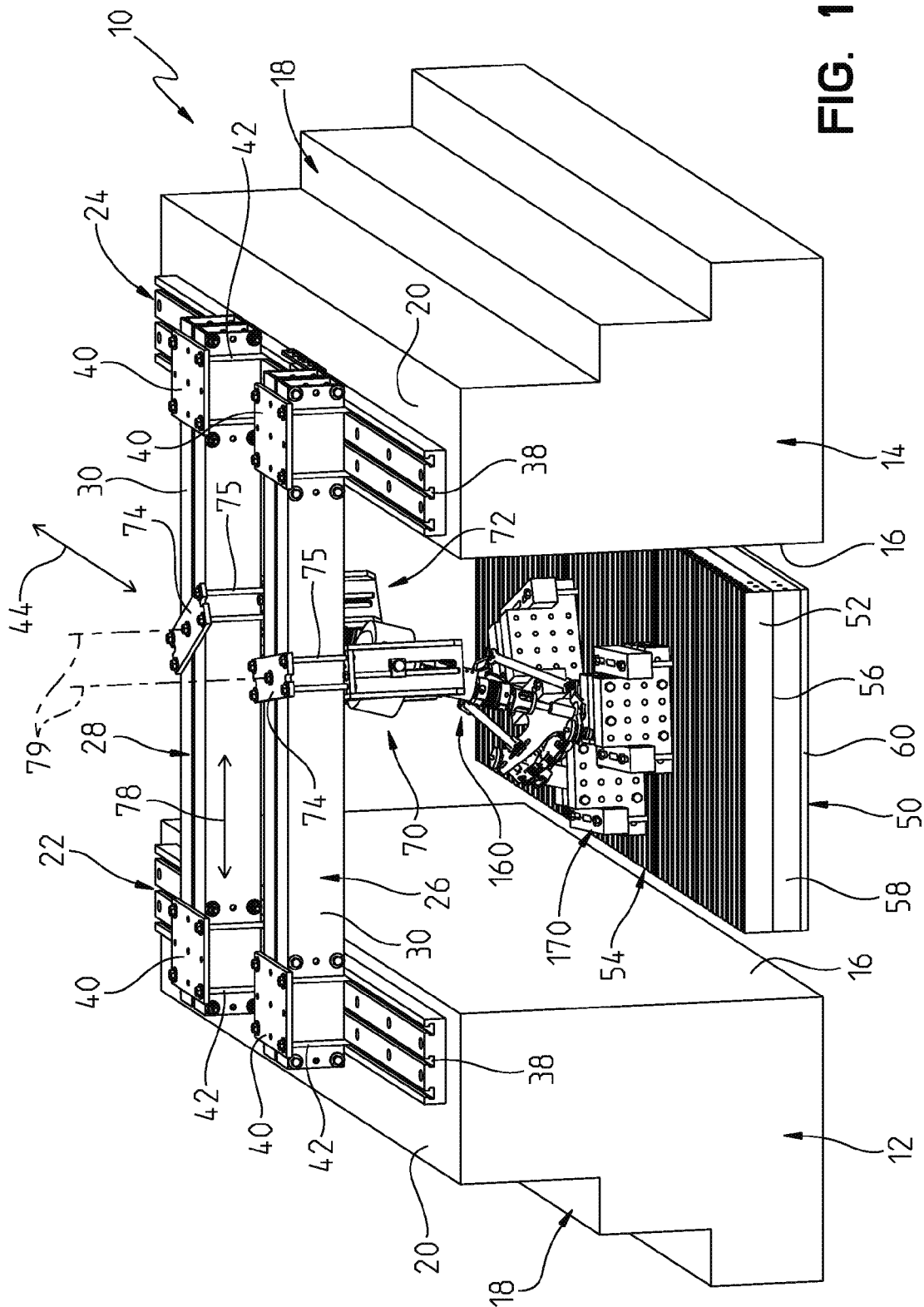
FIG. 1 is a perspective view illustrating a test fixture apparatus of the present disclosure for testing vehicle wiper systems including an illustrative wiper system.

For the purposes of promoting an understanding of the principles of the present disclosure, reference will now be made to the embodiments illustrated in the drawings, which are described below. The embodiments disclosed below are not intended to be exhaustive or limit the present system to the precise form disclosed in the following detailed description. Rather, the embodiments are chosen and described so that others skilled in the art may utilize their teachings. Therefore, no limitation of the scope of the claimed present system is thereby intended. The present system includes any alterations and further modifications of the illustrated devices, systems and described methods and further applications of the principles of the present disclosure which would normally occur to one skilled in the art. Corresponding reference characters indicate corresponding parts throughout the several views.

FIG. 1 illustrates a test fixture apparatus 10 of the present disclosure. In an illustrated embodiment, the test fixture 10 detects forces at a plurality of wiper system to vehicle connection points under controlled loading conditions. The test fixture 10 approximates an infinite-mass boundary condition for the wiper system.

The test fixture 10 illustratively includes first and second spaced apart support walls 12 and 14. Support walls 12 and 14 include an inner surface 16 and a stair-stepped outer surface 18. The stairs of outer surface 18 facilitate access to overhead support components of the test fixture 10. The support walls 12 and 14 also include a top surface 20 which support first and second track members 22 and 24 on walls 12 and 14, respectively. In an illustrated embodiment, walls 12 and 14 are made of concrete and have appropriate dimensions to minimize the effects of resonance vibrational frequency modes during a test procedure.

Figure 2:
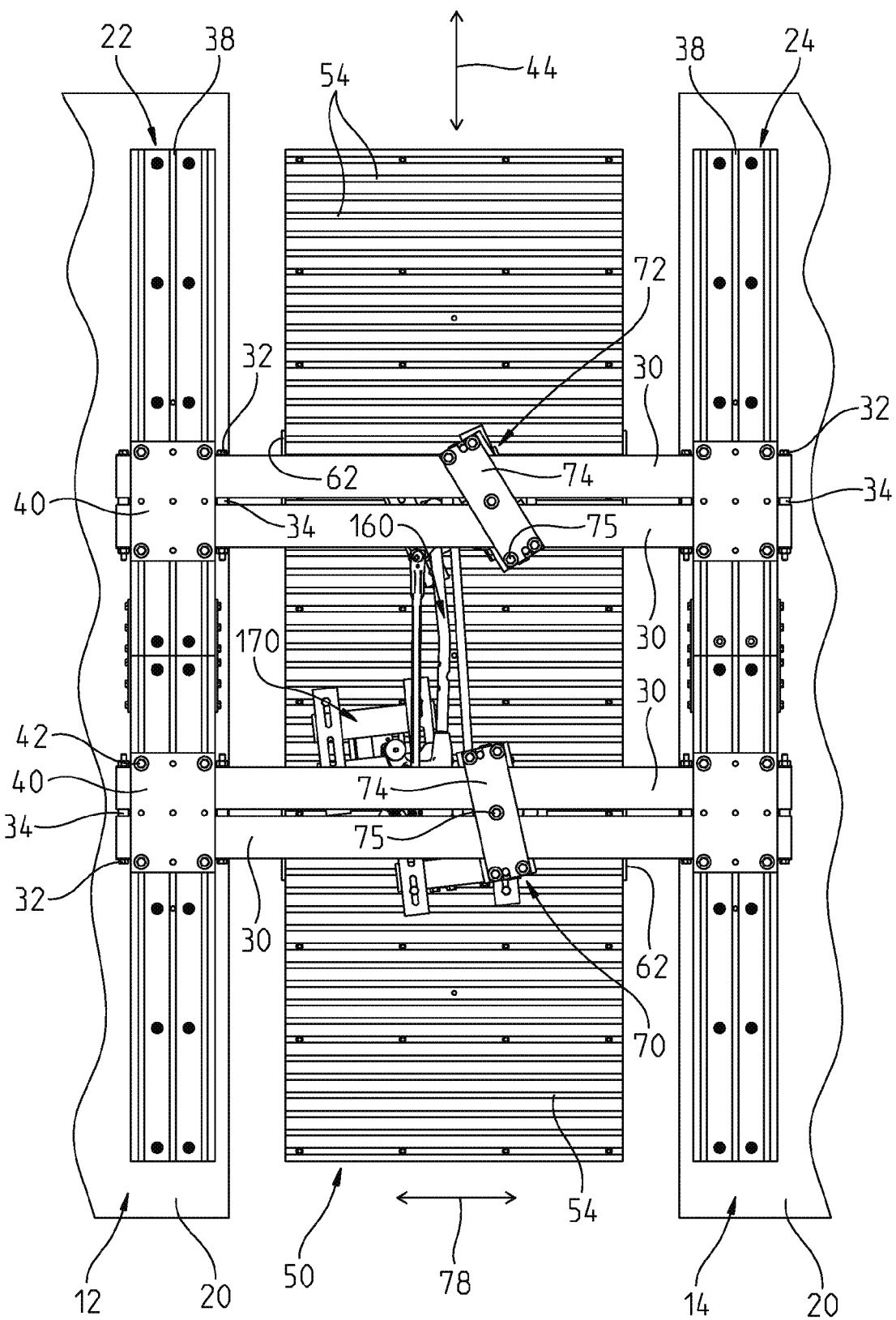
FIG. 2 is a top view of the test fixture of FIG. 1.

First and second cross beam assemblies 26 and 28 extend between the first and second tracks 22 and 24 to span the first and second walls 12 and 14. As best illustrated in FIG. 2, each of the cross beams 26 and 28 includes a pair of spaced apart beams 30 coupled together by suitable fasteners 32 and spacers 34 located between each pair of beams 30. The spacers 34 provide a gap 36 between each pair of beams 30. The use of two beams 30 increases the torsional stiffness of the cross beams 26 and 28. The beams 26 and 28 are configured to have sufficient torsional stiffness, size and rigidity to maintain a natural frequency of the support structure at a frequency high enough to have a negligible effect on the testing procedures as discussed herein. Illustratively, the natural resonant frequencies of the cross beam assemblies 26 and 28 are at least 200 Hz, to avoid interference with the testing procedures. In other words, decoupling between the wiper system 160 and the cross beams 26 and 28 is achieved at frequencies above 200 Hz as described in more detail below.

In an illustrated embodiment, the tracks 22 and 24 include a plurality of T-slots 38 which extend parallel to a longitudinal axis of each of the tracks 22 and 24. The cross beams 26 and 28 are coupled to the tracks 22 and 24 by mounting plates 40 and fasteners 42. Fasteners 42 extend through apertures in mounting plates 40 and are coupled to the T-slots 38 of tracks 22 and 24. The fasteners 42 are loosened to permit the cross beams 26 and 28 to slide back and forth in tracks 22 and 24 in the direction of double-headed arrow 44 in FIGS. 1 and 2 to adjust the positions of beams 26 and 28 to desired locations relative to the support walls 12 and 14. Once the beams 26 and 28 are positioned at the desired locations, fasteners 42 are tightened to secure the beams 26 and 28 in place.

A base 50 is located between the inner surfaces 16 of support walls 12 and 14. The base 50 is illustratively a modular design including a steel top mounting plate 52 having a plurality of laterally extending T-slots 54 formed therein. A first viscoelastic layer 56 is located below the top plate 52. A second steel plate 58 is located below the first viscoelastic layer 56. A second viscoelastic layer 60 is located below the second plate 58. The second viscoelastic layer 60 isolates the top mounting plate 52 from the floor to reduce ambient vibration that may affect the test measurements. Illustratively, the second viscoelastic layer 60 is about one-half inch thick. First and second viscoelastic layers 56 and 60 may apply constrained layer damping (CLD) to resonances of the base 50.

The base 50 typically has vibration modes within the frequency range of interest for testing. However, the viscoelastic layers 60 and 56 combined with the very high mass of the base damp or reduce the effect of these vibration modes. If necessary, additional masses (not shown) may be attached to the base 50 at different locations to shift the frequency of a resonance if the resonance interferes with a testing procedure. T-slots 54 formed in base 50 do not have resonances within the frequency ranges of interest. In an illustrated embodiment, the base is formed by three side-by-side modules connected by plates 62 to form the base 50 as best shown in FIG. 2. The modular design of the base 50 facilitates installation and manufacturing.

As shown in FIGS. 1-4, first and second brake assemblies 70 and 72 are coupled to the first and second cross beams 26 and 28, respectively. In an illustrated embodiment, the brake assemblies 70 and 72 are coupled to cross beams 26 and 28 by mounting plates 74 located on top of the beams 26 and 28 and fasteners 75 which extend through apertures in the mounting plates 74. Fasteners 75 are coupled to supports 76 of the brake assemblies 70 and 72. The support plates 74 are movable along beams 26 and 28 to adjust the location of brake assemblies 70 and 72 in the direction of double-headed arrow 78 shown in FIGS. 1 and 2.

Figure 3:
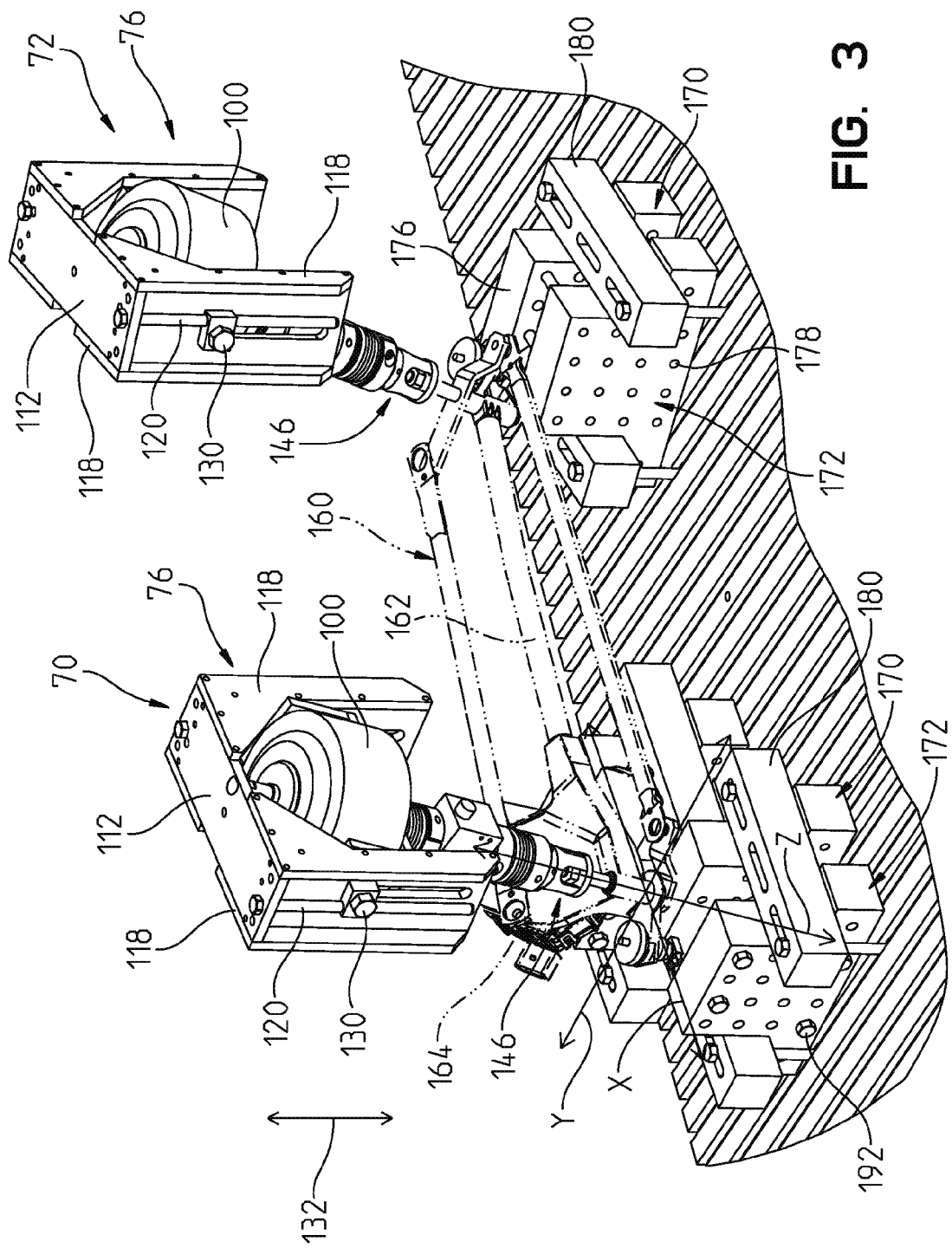
FIGS. 3 and 4 are perspective views illustrating a plurality of mounting blocks for supporting a wiper system to be tested and illustrating first and second brake assemblies for applying resistive torque to wiper arms attachments of the wiper system, with the overhead support structure of FIGS. 1 and 2 removed for illustrative purposes.
Figure 4:
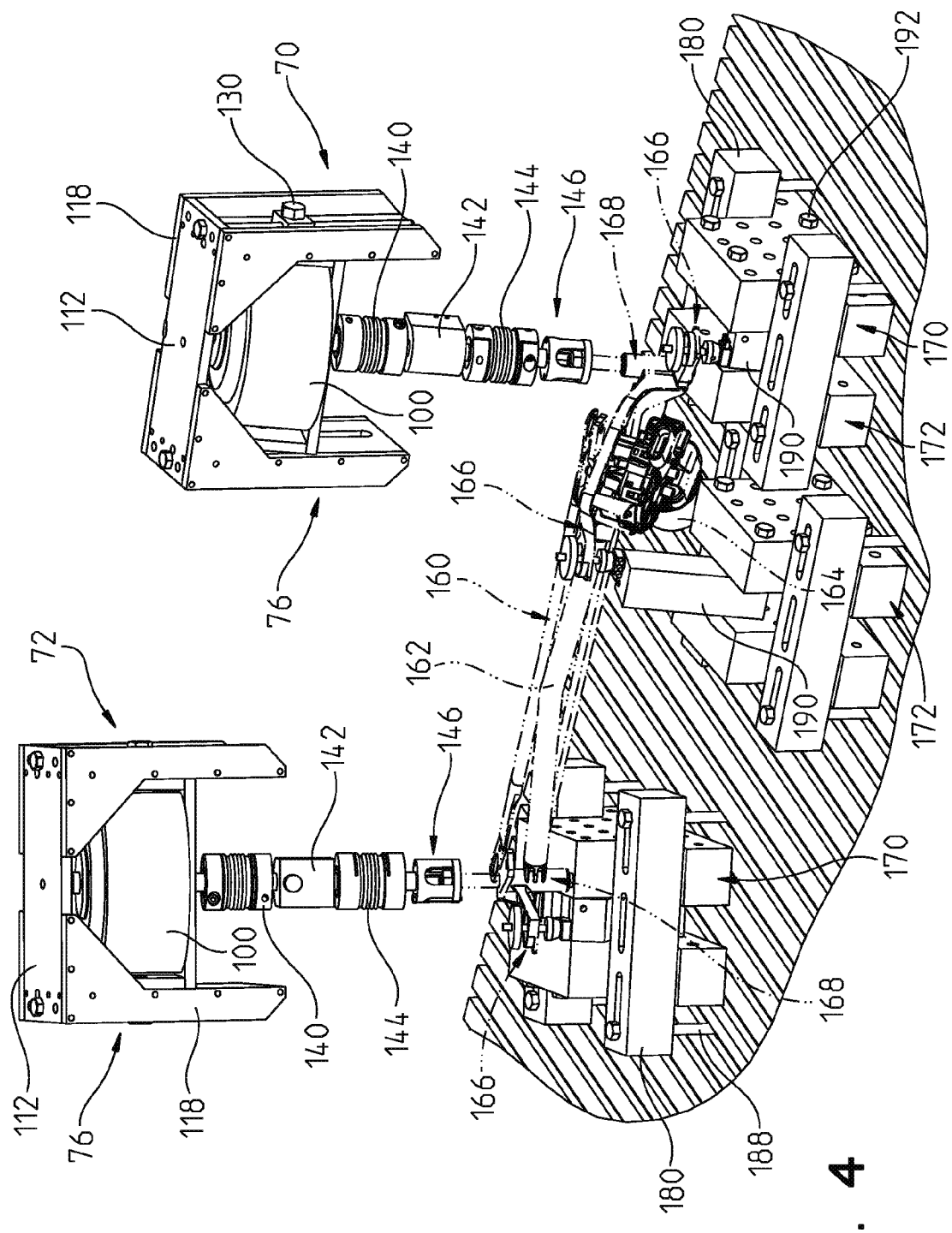
Figure 5:
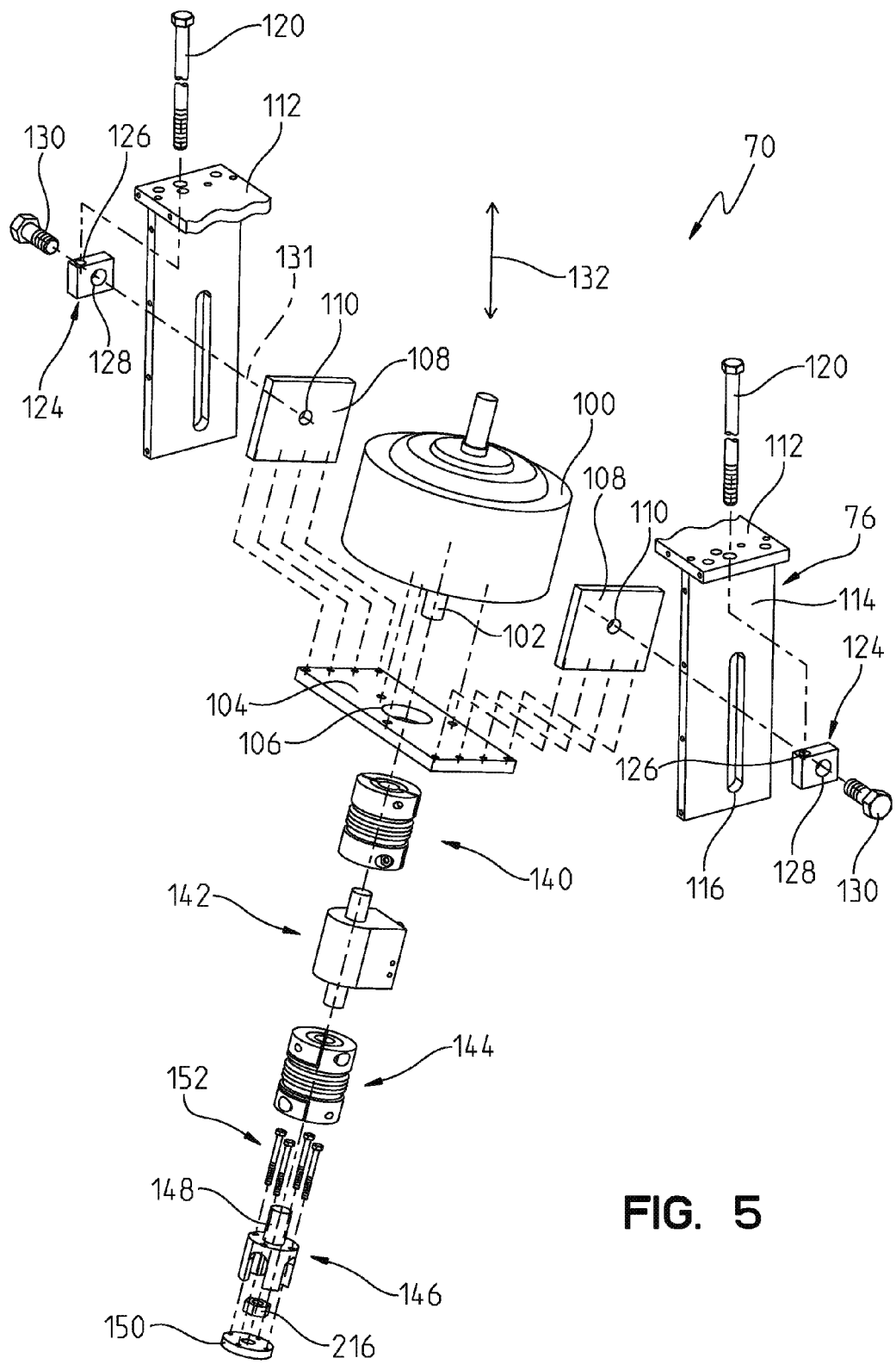
FIG. 5 is an exploded perspective view of one of the brake assemblies shown in FIGS. 1, 3 and 4.

As best illustrated in FIGS. 3-5, each of the brake assemblies 70, 72 include a brake 100 having a central brake shaft 102. The brake 100 is supported by support structure 76. Each brake 100 has five degrees of freedom of movement relative to the support walls 12 and 14 as described herein. Support structure 76 includes a bottom plate 104 having a central aperture 106 configured to receive a bottom end of the brake shaft 102 of brake 100. Bottom plate 104 is coupled to side plates 108 by suitable fasteners. Side plates 108 include a central aperture 110.

Support structure 76 further includes a top support plate 112 and downwardly extending side walls 114 located at opposite ends of the top support plate 112. Side walls 114 are each formed to include an elongated slot 116. Corner support panels 118 shown in FIGS. 1-4 are located at the four corners of the top plate 112 and side walls 114 to provide structural support.

Bolts 120 extend downwardly through apertures 122 at opposite ends of top plate 112. A slide block 124 includes a first aperture 126 configured to receive the rod 120 therein as best shown in FIGS. 3 and 5. Referring to FIG. 5, the slide block 124 includes a second aperture 128 configured to receive a fastener 130 therein. The opposite end of fastener 130 is coupled to mounting plates 108. Fastener 130 is illustratively a threaded fastener or a bolt. Fasteners 130 are loosened to permit the brakes 100 to be adjusted vertically within slots 116 as illustrated by double-headed arrows 132 in FIGS. 3-5. Brakes 100 can also pivot about axis 131 when fasteners 130 are loosened.

Each brake assembly 70, 72 includes a first flexible shaft coupling 140 coupled to brake shaft 102. An opposite end of first flexible shaft coupling 140 is coupled to a first end of a torque transducer 142. A second end 144 of torque transducer 142 is coupled to a second flexible shaft coupling 144. An opposite end of second flexible shaft coupling 144 is coupled to connector 146. A rod 148 of connector 146 extends into an opening formed in second flexible shaft coupling 144. First and second flexible shaft couplings 140 and 144 allow for some misalignment of the brake shaft 102 and isolate vibration between the overhead suspension system including cross beams 26 and 28 and brake assembly support structures 76, for example, and the wiper system 160. Connector 146 is coupled to a disk 150 by suitable fasteners 152. Connector 146 is used to connect the brake assembly 70 to a wiper arm connection point 168 of a wiper linkage 160 as discussed in detail below.

As discussed above, the fixture 10 of the present disclosure is particularly suited for testing windshield wiper systems for vehicles, although other automotive components may also be tested. Such vehicle wiper systems typically include a linkage coupled to a drive motor which reciprocates a pair of wiper arms back and forth to clean a windshield, for example. The wiper arms are typically coupled to the linkage via wiper arm posts. The wiper linkage typically translates one direction rotation of the motor into a back and forth sweep pattern for the wiper arms. Therefore, the wiper linkage is often a four bar linkage with a separate drive link coupled to the motor.

FIGS. 1-4 illustrate an exemplary wiper system 160 having a linkage 162 and a drive motor 164. Each linkage 162 typically includes three to six vehicle connection points 166 which are coupled to the chassis of a vehicle (not shown). The wiper system 160 further includes wiper arm connectors 168 configured to couple the wiper linkage 160 to wiper arms containing the wiper blades. The test fixture 10 of the present disclosure is adjustable to permit testing of various configurations of wiper linkages 162.

Each connection point 166 of the wiper linkage 162 is secured to the base 50 by a mounting block 170. In the embodiment of FIGS. 1-4, three such mounting blocks 170 are shown for the three different connecting points 166 of linkage 162. It is understood that additional mounting blocks 170 may be provided if additional connecting points 166 are provided on the wiper system 162.

Figure 6:
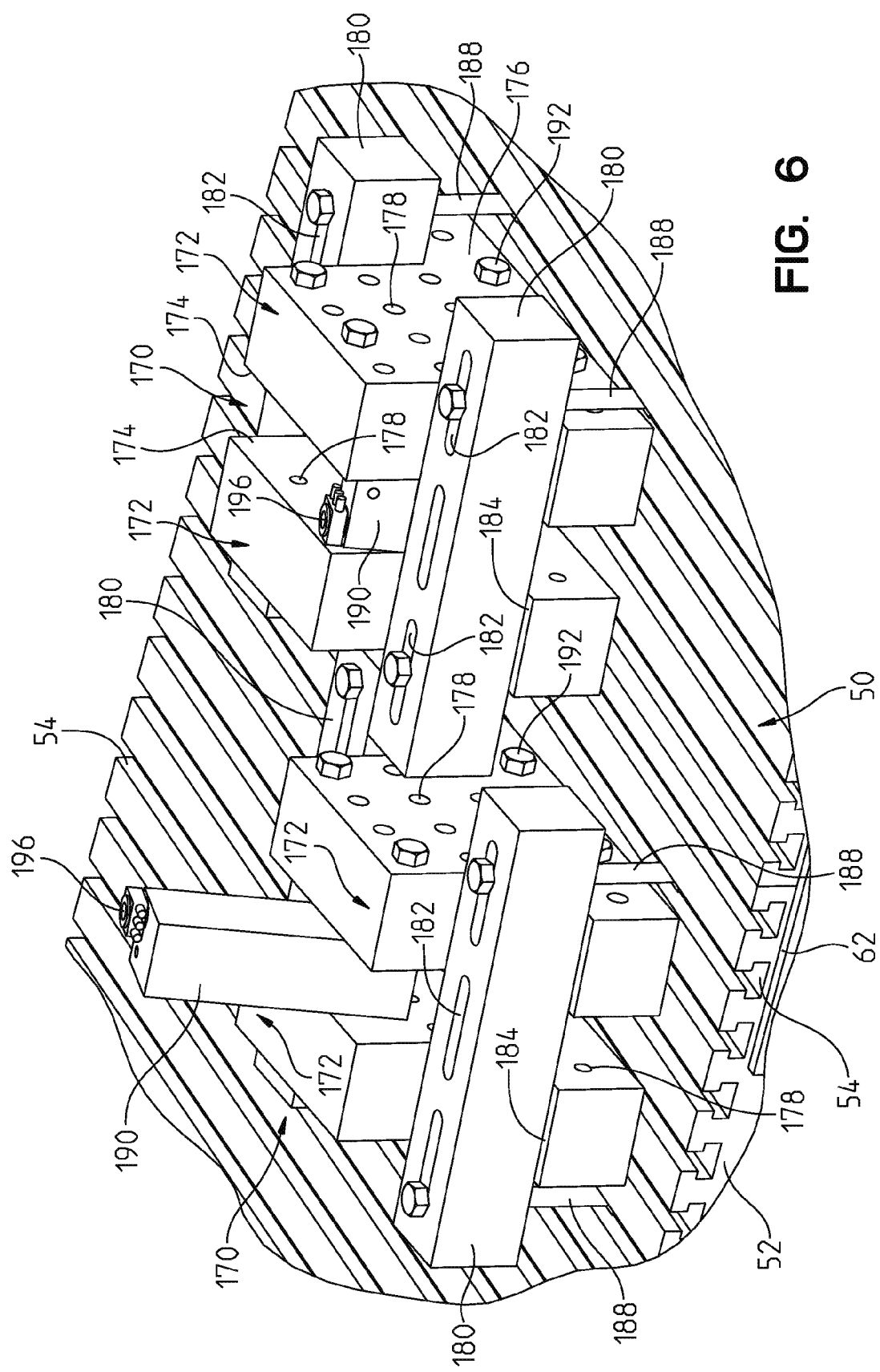
FIG. 6 is a perspective view illustrating further details of mounting blocks for the wiper system.

As best shown in FIG. 6, each mounting block 170 includes first and second T-shaped base members 172. Base members 172 include an inner wall 174, an outer wall 176 and a plurality of apertures 178 extending therebetween. Base members 172 are secured to base 50 by rectangular-shaped connecting blocks 180 having elongated openings 182 formed therein. The blocks 180 rest on a surface 184 formed by legs 186 of the base members 172. Fasteners 188 extend through elongated slots 182 of blocks 180 to secure the blocks 180 to the T-shaped slots 54 of base 50.

A central neck or coupler 190 is located between the pair of base members 172. Fasteners 192 secure the base members 172 together with the coupler 190 clamped therebetween. During installation, the coupler 190 is moved to a desired position. Fasteners 192 are then inserted through selected apertures 178 of base members 172 and tightened. Fasteners 192 do not extend through the coupler 190. A steel sleeve is illustratively located over each of the fasteners 192 between the base members 172. The sleeves have a length equal to a width of coupler 190.

Figure 7:
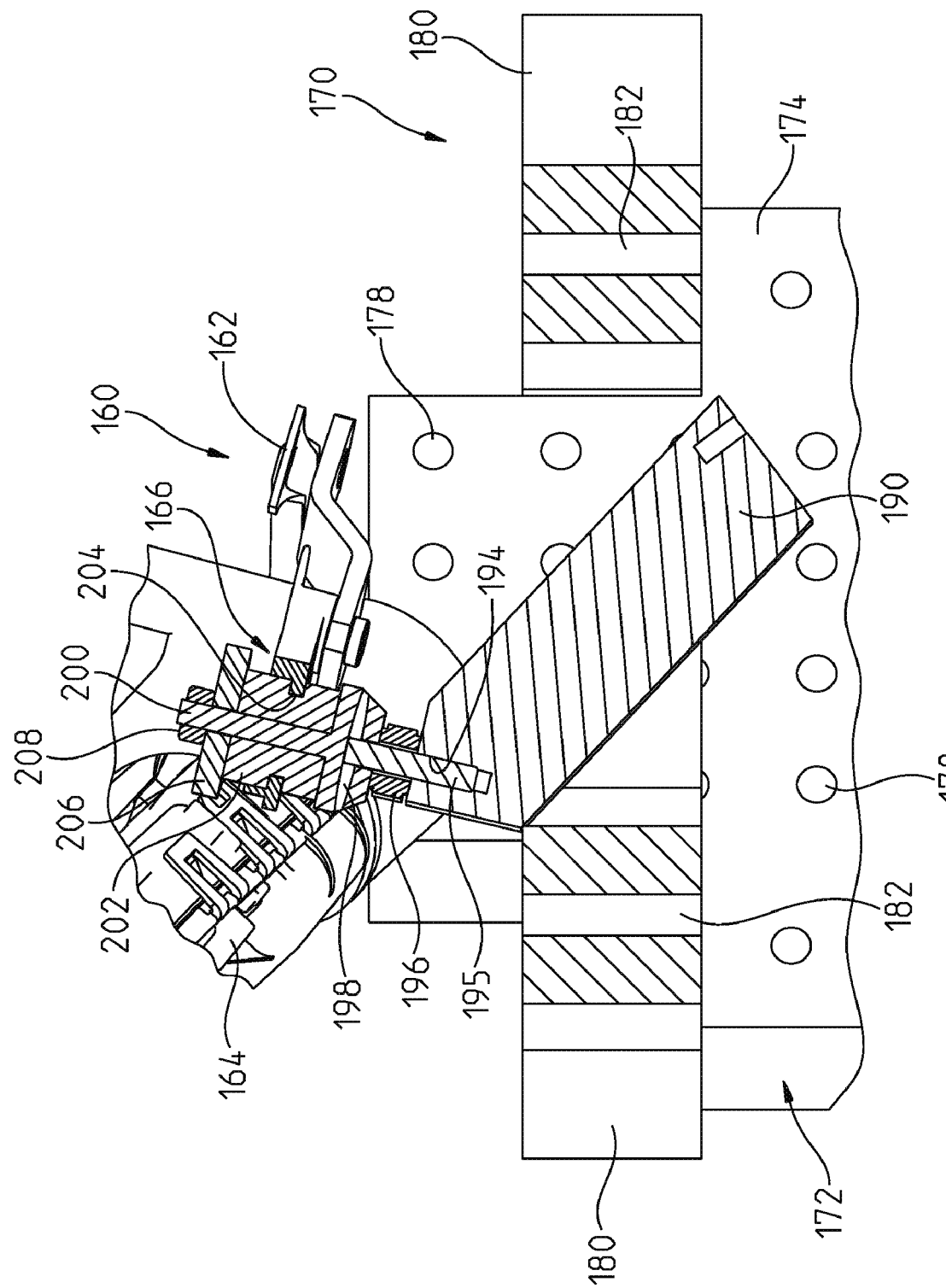
FIG. 7 is a sectional view illustrating a connection point between a mounting block and a vehicle connection point of the wiper system.

Coupler 190 includes a threaded opening 194 used to couple the coupler 190 to a connection point 166 of linkage 162. A threaded stud 195 extends into the threaded opening 194 of coupler 190 as shown in FIG. 7. An opposite end of threaded stud 195 is threaded into a connector 198 located above a force transducer 196. A threaded shaft 200 extends upwardly from connector 198. A bushing 202 is located on threaded shaft 200. The bushing 202 and threaded shaft 200 extend through an opening 204 of a vehicle connecting portion 166 of wiper system linkage 162. A size and shape of bushing 202 varies depending upon the configuration of the connecting points 166 of the linkage 162. A disk 206 is located above the bushing 202. A nut 208 located on threaded shaft 200 secures the connector 198 to the connecting point 166 of linkage 162. The threaded stud 195 applies an axial pre-load force to the force transducer 196. The nut 208 is tightened on shaft 200 to apply an axial pre-load force to the bushing 202. The configuration of FIG. 7 permits the force transducer 196 to measure forces on the connecting portion 166 of linkage 160 in three orthogonal translational directions. These directions include along an X axis, a Y axis and a Z axis taken through the axis of stud 195 and threaded shaft 200.

During installation of the wiper linkage 162, mounting blocks 170 are moved to appropriate locations relative to each of the connecting points 166 of the linkage 162. The connecting points 166 are then secured to the mounting blocks 170 as discussed above to hold the wiper linkage 162 in position on the base 50. The configuration of the base 50 and the mounting blocks 170 which are positionable at various locations and orientations on the base 50 accommodate different wiper system designs.

After each of the connecting points 166 is secured to a mounting block 170, the brakes 100 are then coupled to each wiper arm connection 168 of the wiper linkage 162. Positions of the brake assemblies 70 and 72 are adjusted to desired locations by loosening fasteners 42 and sliding the beams 26 and 28 to a desired location on tracks 22 and 24 as illustrated by double-headed arrow 44. Fasteners 42 are then secured to hold the beams 26 and 28 in position. The brake assemblies 70 and 72 are then moved into a desired position above the wiper arm connectors 168 by adjusting their positions in the direction of double-headed arrow 78. The brake assemblies 70 and 72 may also be related relative to the beams 26 and 28, respectively, about a central axis 79. Fasteners 75 are then tightened to secure the brake assemblies 70, 72 to the beams 26, 28. Fasteners 130 of the brake assemblies 70, 72 are then loosened to move the brake 100 to a desired height as illustrated by double-headed arrow 132 of FIG. 5. The brakes 100 can also pivot about axis 131 to desired angular position. Once the brake assemblies 70, 72 are properly positioned with connectors 146 located adjacent wiper arm connections 168, fasteners 130 are tightened to secure the brake 100 in the proper orientation. The test fixture 10 provides five degrees of freedom of movement of brakes 100 while maintaining the desired stiffness characteristics to minimize the effects of resonance frequencies of the test fixture 10 on the force measurements.

Figure 8:
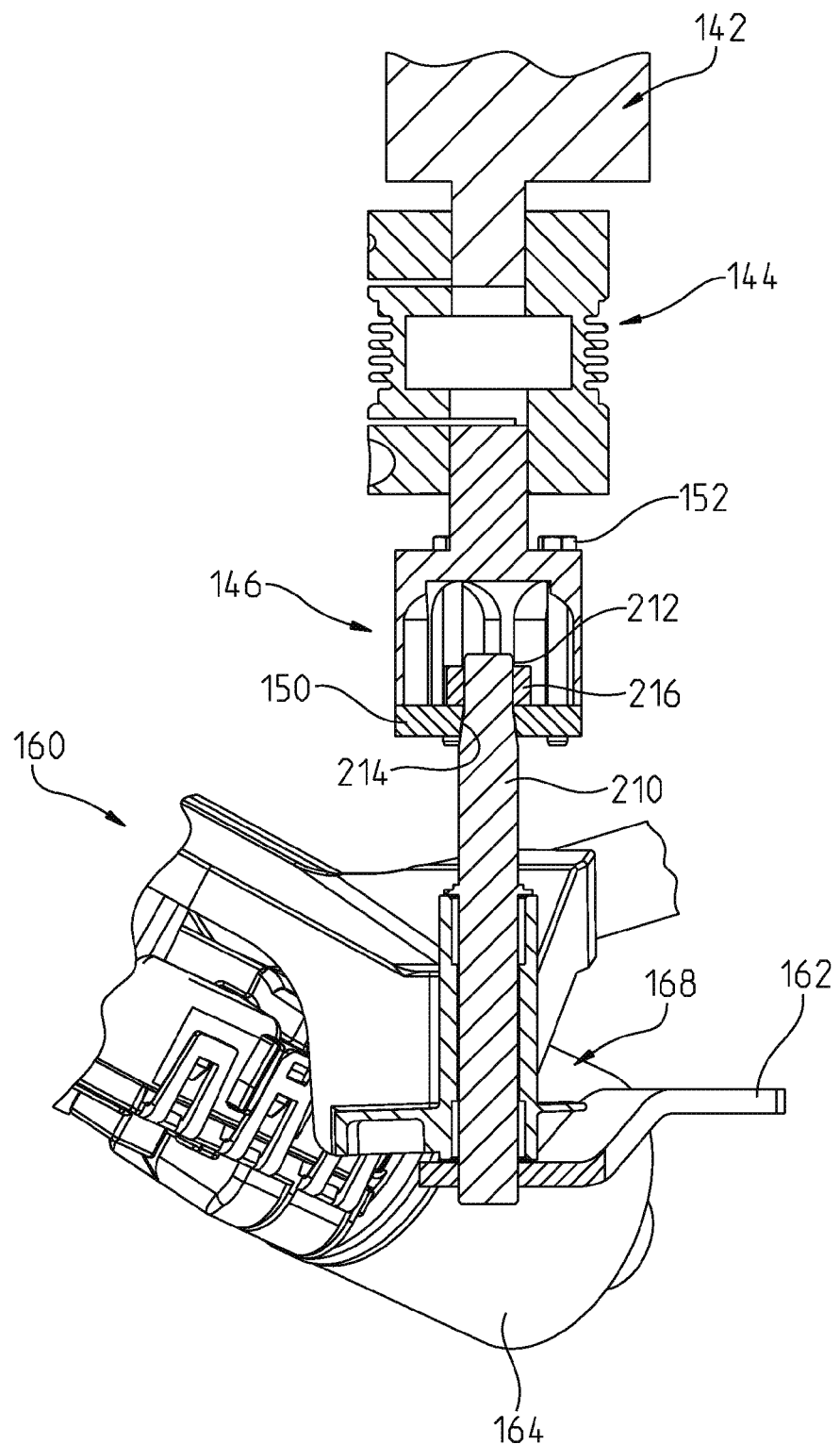
FIG. 8 is a sectional view taken through an end of the brake assembly showing connection of the brake assembly to a wiper arm connection point of the wiper system.

FIG. 8 illustrates the connection of the brake assembly 70, 72 to the wiper arm connector 168. Wiper arm connector 168 often includes a mounting post 210 having a tapered, knurled seat 212 which typically receives the wiper arm assemblies of a vehicle wiper system. Bottom mounting disk 150 of connector 146 has a tapered opening 214 configured to match the tapered knurled seat 212 of post 210. A nut 216 is configured to pull the knurled seat 214 of post 210 into engagement with the knurled seat 214 of disk 150 to secure the connector 146 to the post 210.

Once both the wiper arm posts 210 of connector portions 168 are secured to the brakes 100, a test procedure is ready to begin. Brakes 100 apply resistive torque to the wiper system through wiper arm connecting post 210. The torque transducers 142 of brake assemblies 70, 72 measure the torque applied to the wiper system linkage 162 by brakes 100. An operator may adjust the force applied by brakes 100 to desired torque levels determined by the outputs of transducers 142.

The motor 164 of wiper system 160 is actuated to move the linkage 162 which in turn moves the wiper arm posts 210 against the resistive torque of the brakes 100. Force transducers 196 then measure forces along the three separate axes as discussed above. Three axes of force measurement are illustrated as an X axis, a Y-axis and a Z-axis in FIG. 3. The orientations of the three axes are not fixed. In other words, the orientations of three axes vary depending on how the mounting blocks 170 are set up.

The large size support walls 12 and 14 and the configuration of base 50 reduce the number of resonant frequencies within the frequencies of interest for the testing procedure. The mounting blocks 170 with the clamped coupler 190 allows for flexibility of positioning without generating resonances in the frequency ranges of interest. The first mode of vibration occurs at about 3,300 Hz for the connecting blocks 170. Therefore, the test fixture 10 measures forces on the connecting points 166 in three translational directions while approximating an infinite-mass boundary condition for the wiper system 160 for frequencies significantly below 3300 Hz. The brakes 100 apply a user adjustable smooth resistive torque to the wiper arm connection points 168 of wiper system 160 to provide an appropriate operating load. Measuring the forces at connecting points 166 of the wiper linkage 162 under an infinite-mass boundary condition are correlated to in-vehicle noise performance of the wiper system 160. Therefore, the test fixture 10 of the present disclosure permits various configurations of wiper systems 160 to be tested for noise performance without requiring the wiper systems to be installed in a vehicle.

In an illustrative embodiment, a test procedure for the wiper system 160 is conducted by the test fixture 10 to measure the 'blocked forces' for a frequency range of 10 Hz to 1,000 Hz. Higher frequency testing procedures, such as at about 2,000 Hz or above, may also be used in other illustrated embodiments. Components of the system such as the cross beam assemblies 26 and 28 have resonant frequencies within the testing frequency range. However, the test fixture 10 provides suitable isolation so that such resonant frequencies do not affect the test data. For example, the flexible shaft couplings 140 and 144 and the viscoelastic layers 56 and 60 provide suitable isolation as discussed above.

While an illustrated embodiment of the present disclosure includes a wiper system 160 having a wiper linkage 162, other wiper systems without a linkage or having differing number of connection points and/or wiper arm connectors may also be tested by the test fixture 10 of the present disclosure. Due to space constraints or other design criteria, other wiper system embodiments include at least one reversing motor and a gear reduction drive used to drive at least one wiper arm connector. In certain embodiments, three or more wiper arm connectors are provided in the wiper system to connect to three or more wiper arms. In other embodiments, such as a rear window wiper for automotive applications, for example, a single wiper arm connector is provided, with or without a linkage. Therefore, the present disclosure is not limited to the wiper system and linkage embodiment disclosed in the exemplary drawings.

While this disclosure has been described as having exemplary designs and embodiments, the present system may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

What is claimed is:

1. A test fixture for an automotive wiper system including a plurality of connection points, first and second wiper arm connectors, and a motor configured to move the first and second wiper arm connectors, test fixture comprising:
   first and second spaced apart support walls, each support wall having an inner surface and a top surface;
   a base located between the inner surfaces of the first and second support walls;
   first and second tracks coupled to the top surfaces of the first and second support walls, respectively;
   first and second cross beams moveably coupled to the first and second tracks;
   first and second brake assemblies coupled to the first and second cross beams, respectively, the first and second brake assemblies each including a brake support structure coupled to a respective one of the first and second cross beams so that each brake support structure is moveable along a longitudinal axis of the cross beam and is also rotatable relative to the cross beam, the first and second brake assemblies also including a brake coupled to the brake support structure and a connector coupled to a brake shaft of the brake, the connector being configured to be coupled to one of the wiper arm connectors so that the brake applies a resistive torque to the wiper arm connector;
   a torque sensor mounted to each brake shaft of the first and second brake assemblies, the torque sensor measuring the resistive torque applied by the brake to the wiper arm connector;
   a plurality of mounting blocks configured to be coupled to the base at a plurality of selected locations, each mounting block including a coupler configured to be coupled to one of the connection points of the wiper system; and
   a plurality of force sensors, a force sensor being coupled between each coupler and the connection point of the wiper system, the force sensors measuring forces at the connection points of the wiper system during movement of the first and second wiper arm connectors by the motor.

2. The test fixture of claim 1, wherein the first and second support walls are formed from concrete.

3. The test fixture of claim 1, wherein the first and second support walls include a stair-stepped outer surface.

4. The test fixture of claim 1, wherein the first and second tracks each include a plurality of longitudinally extending slots configured to receive fasteners to secure the first and second cross beams to the first and second tracks.

5. The test fixture of claim 1, wherein the first and second cross beams each include a pair of beams coupled together to increase torsional stiffness of the cross beams.

6. The test fixture of claim 5, wherein the pair of beams are held spaced apart by a plurality of spacers.

7. The test fixture of claim 1, wherein a first natural resonance frequency of the first and second cross beams coupled to the first and second support walls is at least 200 Hz.

8. The test fixture of claim 1, wherein each of the first and second cross beams are releaseably secured to the first and second tracks by first and second mounting plates and a plurality of fasteners configured to couple the first and second mounting plates to the first and second tracks, respectively.

9. The test fixture of claim 1, wherein the base includes a top mounting plate having a plurality of mounting slots formed therein and at least one viscoelastic layer located below the top mounting plate, the viscoelastic layer being configured to isolate the top mounting plate from the floor.

10. The test fixture of claim 1, wherein the base includes a top mounting plate, a first viscoelastic layer located below the top mounting plate, a support plate located below the first viscoelastic layer, and a second viscoelastic layer located below the support plate.

11. The test fixture of claim 10, wherein the base includes a plurality of modular sections configured to be coupled together to form the base.

12. The test fixture of claim 1, wherein each brake support structure permits vertical adjustment of the brake relative to the first and second cross beams.

13. The test fixture of claim 12, wherein each brake support structure also permits rotation of the brake assembly about a mounting axis of the brake to the support structure.

14. The test fixture of claim 1, wherein each brake assembly further includes at least one flexible shaft coupling coupled between the brake shaft and the connector, that at least one shaft coupling allowing for misalignment of the brake shaft with the wiper arm connector and isolates the wiper system from vibrations of the first and second cross beams and the first and second support walls.

15. The test fixture of claim 1, wherein each wiper arm connector includes a mounting post having a tapered seat, and wherein each connector of each of the first and second brake assemblies includes a mounting member having a tapered opening configured to receive the tapered seat of the mounting post.

16. The test fixture of claim 15, wherein each connector of each of the first and second brake assemblies further includes a nut configured to engage the mounting post to pull the tapered seat of the mounting post into engagement with the tapered opening of the mounting member to secure the brake to the wiper arm connector.

17. The test fixture of claim 1, wherein each of the plurality of mounting blocks includes first and second spaced apart base members having a plurality of apertures formed therein, the first and second base members being secured to the base at selected locations, each of the plurality of mounting blocks also including a coupler positioned between the first and second base members and a plurality of fasteners extending through the apertures of the first and second base members to secure the coupler in a desired position between the first and second base members with a connecting portion of the coupler being attached to a connection point of the wiper system.

18. The test fixture of claim 17, wherein the coupler is clamped between the first and second base members and held in position therebetween without the plurality of fasteners passing through the coupler.

19. The test fixture of claim 17, wherein the first and second base members are T-shaped.

20. The test fixture of claim 19, further comprising first and second connecting blocks located over arms of the T-shaped base members to secure the base members to the base.

21. The test fixture of claim 17, wherein one of the plurality of force sensors is coupled to each coupler by a threaded stud.

22. The test fixture of claim 21, further comprising a connector coupled to each threaded stud, the connector including a threaded shaft configured to support a bushing thereon, the bushing being configured to be coupled to one of the connection points of the wiper system, and further comprising a disk located on the threaded shaft above the bushing and a nut coupled to the threaded shaft, the nut being adjustable to apply an axial pre-load force on the bushing.

23. The test fixture of claim 21, wherein the threaded stud applies an axial pre-load force to the force sensor.

24. The test fixture of claim 1, wherein the brakes of the first and second brake assemblies are configured to provide an adjustable resistive torque to the first and second wiper arm connectors of the wiper system during movement of the first and second wiper arm connectors by the motor, and wherein each of the plurality of force sensors provides output signals indicating forces detected along three axes for each of the plurality of connection points of the wiper system as the motor moves the first and second wiper arm connectors against the resistive forces of the brakes.

25. The test fixture of claim 1, wherein the brakes of the first and second brake assemblies each have five degrees of freedom of movement relative to the first and second support walls.

26. The test fixture of claim 1, wherein the wiper system includes a linkage providing the plurality of connection points and first and second wiper arm connectors, the motor being coupled to the linkage to move the linkage, thereby moving the first and second wiper arm connectors.

27. A test fixture for an automotive wiper system including a plurality of connection points, at least one wiper arm connector, and a motor configured to move the at least one wiper arm connector, the test fixture comprising of:
first and second spaced apart support walls, each support wall having an inner surface and a top surface;
a base located between the inner surfaces of the first and second support walls;
first and second tracks coupled to the top surfaces of the first and second support walls, respectively;
at least one cross beams moveably coupled to the first and second tracks;
at least one brake assembly, each brake assembly including a brake support structure coupled to a cross beam so that the brake support structure is moveable along a longitudinal axis of the cross beam and is also rotatable relative to the cross beam, the at least one brake assembly also including a brake coupled to the brake support structure and a connector coupled to a brake shaft of the brake, the connector being configured to be coupled to a wiper arm connector so that the brake applies a resistive torque to the wiper arm connector;
a torque sensor mounted to the brake shaft of the at least one brake assembly, the torque sensor measuring the resistive torque applied by the brake to the wiper arm connector;
a plurality of mounting blocks configured to be coupled to the base at a plurality of selected locations, each mounting block including a coupler configured to be coupled to one of the connection points of the wiper system; and
a plurality of force sensors, a force sensor being coupled between each coupler and the connection point of the wiper system, the force sensors measuring forces at the connection points of the wiper system during movement of the at least one wiper arm connector by the motor.

28. The test fixture of claim 27, wherein the brake of the at least one brake assembly is configured to provide an adjustable resistive torque to the at least one wiper arm connector of the wiper system during movement of the at least one wiper arm connector by the motor, and wherein each of the plurality of force sensors provides output signals indicating forces detected along three axes for each of the plurality of connection points of the wiper system as the motor moves the at least one wiper arm connector against the resistive forces of the brakes.

29. The test fixture of claim 27, wherein the brake of the at least one brake assembly has five degrees of freedom of movement relative to the first and second support walls.

30. The test fixture of claim 27, wherein the wiper system includes a linkage providing the plurality of connection points and first and second wiper arm connectors, the motor being coupled to the linkage to move the linkage, thereby moving the first and second wiper arm connectors.

* * * * *